United States Patent [19]

Sundell

[11] Patent Number: 5,262,367
[45] Date of Patent: Nov. 16, 1993

[54] MGO-C BRICK CONTAINING A NOVEL GRAPHITE

[75] Inventor: David R. Sundell, Pittsburgh, Pa.

[73] Assignee: Indresco Inc., Dallas, Tex.

[21] Appl. No.: 981,704

[22] Filed: Nov. 25, 1992

[51] Int. Cl.⁵ .................. C04B 35/04; C04B 35/54; C21B 7/06
[52] U.S. Cl. ...................... 501/101; 501/97; 501/109; 266/280
[58] Field of Search ...................... 501/101, 87, 90, 96, 501/97, 109; 266/280

[56] References Cited

U.S. PATENT DOCUMENTS

| | | | |
|---|---|---|---|
| 3,442,669 | 5/1969 | Osterholtz | 501/101 |
| 4,248,638 | 2/1981 | Yomota et al. | 501/101 |
| 4,292,082 | 9/1981 | Danjyo et al. | 501/101 |
| 4,306,030 | 12/1981 | Watanabe et al. | 501/101 |
| 4,431,744 | 2/1984 | Kernion et al. | 501/101 |
| 4,431,745 | 2/1984 | Watanabe et al. | 501/101 |
| 4,454,239 | 6/1984 | Cassens, Jr. | 501/101 |
| 4,521,357 | 6/1985 | Kernion et al. | 501/101 |
| 4,540,675 | 9/1985 | Morris et al. | 501/101 |
| 4,747,985 | 5/1988 | Addink et al. | 501/101 |
| 4,912,068 | 3/1990 | Michael et al. | 501/101 |
| 4,957,887 | 9/1990 | Michael et al. | 501/101 |

*Primary Examiner*—Karl Group
*Assistant Examiner*—Deborah Jones

[57] ABSTRACT

A mix for forming a magnesite-carbon refractory shape comprising from about 70 to 97 wt. % deadburned magnesite and about 3 to 30 wt. % flake graphite, and for each 100 wt. % of said magnesite and graphite, from about 1.5 to 6 wt. % of a carbon-containing bonding agent; said graphite containing from 90 to 99 wt. % carbon and having a lime/silica ratio greater than 0.2 in its ash and said magnesite containing greater than 95 wt. % magnesia, and the resultant magnesite-carbon refractory shapes and liners for metal processing equipment made from such shapes and the method of increasing the life of liners for such equipment.

21 Claims, 1 Drawing Sheet

MGO-C BRICK CONTAINING A NOVEL GRAPHITE

BACKGROUND OF THE INVENTION

This invention relates to carbon-containing refractories and in particular magnesite-carbon refractory brick suitable for use in metal processing equipment, especially basic oxygen furnaces (BOF), slaglines in ladles, electric arc furnaces, and ladle metallurgical furnaces. In these applications, the essential requirements for prolonged service are high hot strength and high slag resistance.

The traditional use of carbon-containing brick had been in the basic oxygen furnace. The brick most commonly used in the U.S. during the early 1960's was a pitch bonded or a burned pitch impregnated magnesite brick which contained about 5% max. residual carbon. In Europe, the practice of using pitch bonded or pitch impregnated burned dolomite brick evolved as the preferred BOF lining. In Japan, burned pitch impregnated brick containing about 70% MgO/30% CaO were favored.

In the late '70's and early ,80's a major breakthrough occurred in refractory technology for the BOF. The introduction of magnesite brick containing graphite had a major impact on prolonging service life of the brick to a new record number of heats. A series of magnesite-carbon brick were introduced which had a range of graphite from 3 to 30%. Depending upon shop practice certain more narrow ranges of graphite, for example, 10-12 or 15-17%, seemed to provide optimum service in certain furnaces. The major reason these types of brick gave increased service life was the increase in slag resistance offered by graphite.

In the late '70's, additions of fine metals like silicon, aluminum, magnesium and various alloy combinations of these metals were added to magnesite-carbon brick. These additions in minor levels ranging from 0 to 5 wt. % imparted increased hot strength and oxidation resistance to the refractory. The effect of the metals on hot strength depended on the type of metal used. For instance, aluminum and magnesium tended to increase hot strength, whereas additions of silicon had the opposite effect. Numerous patents, such as U. S. Pat. No. 4,306,030, describe this art. These additions noticeably extended lining life. It is believed the metals are capable of providing various functions. They can act as oxygen "getters" thereby consuming oxygen which otherwise would at higher temperatures be able to consume carbon, and if not involved with oxygen can at higher temperatures react with fine carbon derived from the brick's resin bond, pitch bond, or from pitch impregnation to produce carbides. The effect of the newly formed oxide or carbide phases is to lower the permeability of the brick, thereby allowing less oxygen or slag to enter into the brick which causes destructive reactions to occur. Another effect, especially with formation of aluminum carbides, was to significantly increase hot strength. Hot strength is perceived to be a very important parameter governing life of a refractory in demanding applications like the BOF. Refractories in such applications are under considerable mechanical and thermal stress. Simple fracture or spalling can often occur when the stresses become greater than the strength of the refractory lining.

Although major advances in lining life have been made with metal-containing magnesite-carbon brick, the addition of fine metals does have certain disadvantages. These disadvantages are the increased cost of the refractory due to the high cost of the metals, the safety considerations which must be dealt with in brick manufacture due to the explosive nature of the fine metals, the higher thermal expansion of brick made with metals which necessitates greater need for expansion allowances, and the increased hydration potential of metal-containing brick. There is also the concern that if the metal content becomes too high, slag resistance of the refractory may suffer because of the formation of low melting eutectics which has a deleterious effect on hot strength.

Because of these concerns with metal additions, research work was started in the development of metal-free or very low metal containing refractories. This work led to U.S. Pat. Nos. 4,912,068 and 4,957,887. It was found in the '068 patent that an improved metal-free magnesite-carbon refractory could be made if the purity of the magnesite and graphite were highly controlled. Brick of increased hot strength compared to metal-containing brick could be made by using dead-burned magnesite of at least 98% MgO, less than 0.03% boron oxide, less than 0.3% silica, and having a lime/silica weight ratio above 2. The flake graphite purity had to be at least 98% carbon. A further advance in hot strength was made in the '887 patent where it was found that additional improvements within the high purity magnesite-carbon system could be made by adding to the base mix controlled levels of the fine metals. The levels were within the restricted range of 0.1 to 1 wt. % with any combination of the metals not exceeding 1 wt. %.

Table I outlines the evolution of the above-described magnesite-carbon brick and the changes in hot strength which have occurred with each advance. For purposes of discussion, hot strength is defined as the strength of the refractory when crushed at 2800° F.

TABLE I

| Comparison of Typical Hot Strengths of Magnesite-Carbon Refractories | | | | | |
|---|---|---|---|---|---|
| Brick Type: | Burned Magnesite Pitch Impregnated | Resin Bonded Mag-Carbon* | Metal-Containing Resin Bonded Mag-Carbon* | Resin Bonded High Purity Mag-Carbon** | Resin Bonded High Purity Mag-Carbon** |
| Graphite Content, %: | 0 | 17 | 17 | 17 | 17 |
| Aluminum Content, %: | 0 | 0 | 3 | 0 | 1.0 |
| Crushing Strength at 2800° F., psi: | 2830 | 2140 | 4700+ | 2950 | 4410 |

*The magnesite used in these mixes had an MgO content of 96% and the flake graphite had an LOI of 96.5%.
**The magnesite used in these mixes had an MgO content of 99% and the flake graphite had an LOI of 99%.

The major disadvantage of these compositions are the limited supply of expensive high purity magnesite and flake graphite. The need, therefore, exists to find a means of developing high hot strength in lower purity magnesite-carbon brick without the detrimental effects of adding large amounts of metals.

SUMMARY OF THE INVENTION

It is the object of this invention to provide an improved magnesite-carbon brick for metallurgical furnaces which has increased hot strength. The improvements in hot strength are obtained in a novel way by utilizing a low cost, less pure flake graphite which has a comparatively high lime/silica ratio in its ash. Such improvements in hot strength were only previously possible by using very high purity expensive raw materials (99% pure) or by adding relatively high levels of metal (from 1 to 5%). This invention offers a cost effective means of improving the high temperature strength of magnesite-carbon brick.

Briefly, this invention comprises a mix for forming a magnesite-carbon refractory shape comprising from about 70 to 97 wt. % deadburned magnesite and, correspondingly, about 3 to 30 wt. % flake graphite and for each 100 wt. % of said magnesite and graphite from about 1 to 6 wt. % of a carbonaceous bonding agent, said magnesite containing at least about 95% MgO, and said graphite having a lime/silica ratio in its ash greater than 0.2 and said graphite having a carbon content ranging from 90 to 99 wt. % as measured by the loss-on-ignition test.

The invention also comprises the resultant refractory shapes and particularly brick and liners for metallurgical vessels having an increased life using said brick as hereinafter set forth. Brick made according to this invention have improved 2800° F. crushing strength which reflects an improved high temperature stability between the phases comprising the refractory.

DETAILED DESCRIPTION

Figure 1:
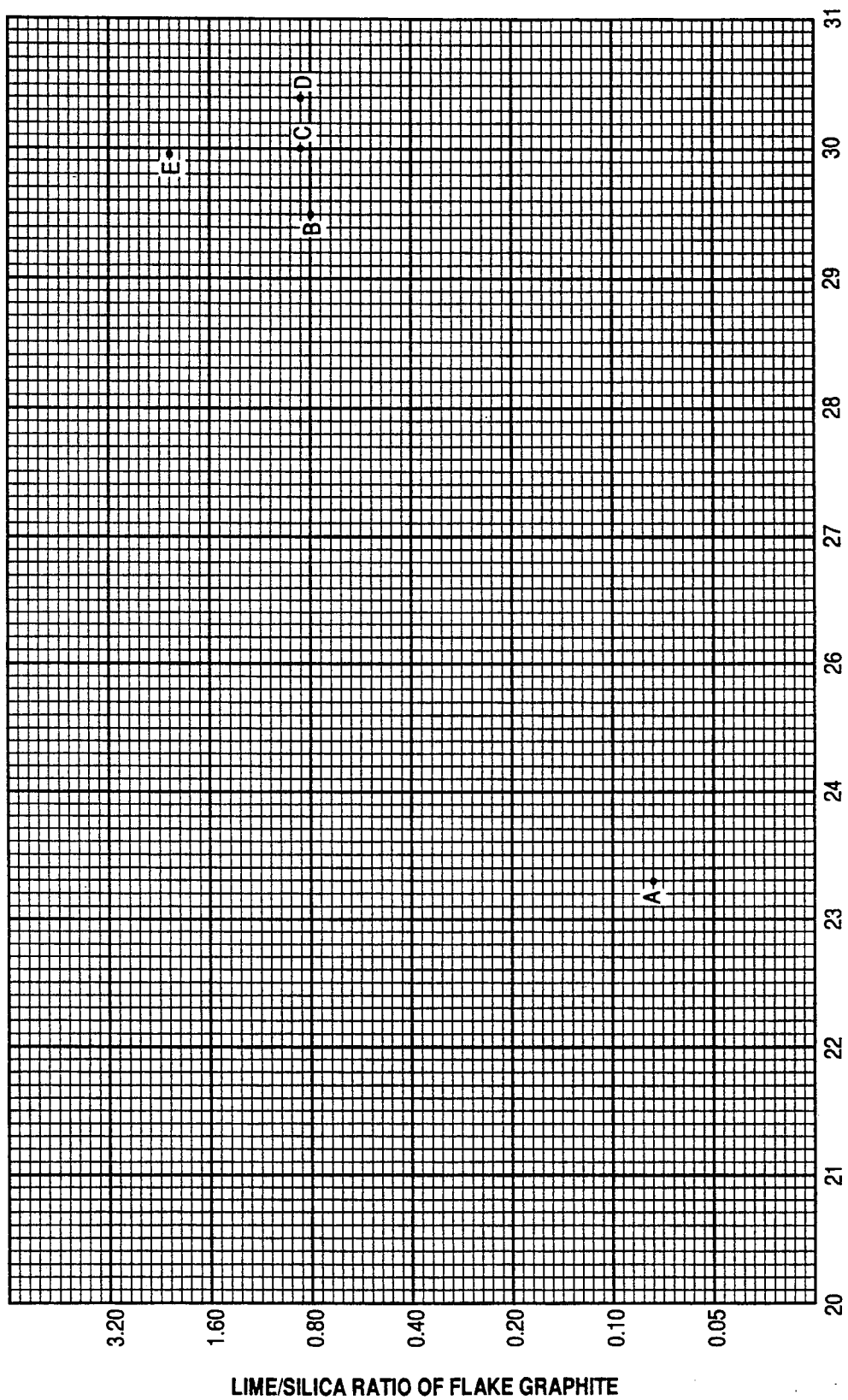
FIG. 1 is a graph depicting the effect of the lime/silica ratio in graphite on the hot crushing strength.

The essential element of the instant invention is the use of a flake graphite which has a comparatively high lime/silica ratio in its ash.

The flake graphite must have a lime/silica ratio in its ash greater than 0.2 and a carbon content ranging from 90 to 99 wt. % as measured by the loss-on-ignition test.

The major sources of flake graphite are China (about 57%), Canada (about 10%), Zimbabwe (about 9%), Madagascar (about 8%), and Brazil (about 6%). Table I-a lists all of the common commercially available flake graphites from China and most other countries which range in carbon contents from 85% to 95% and have an ash chemistry which contains significantly more silica than lime. That is, the lime to silica ratio is typically 0.1 or less.

Table I-b shows that some of the Canadian flake graphite sources, such as Mazarin and Amalgamet are like the other world sources in that their ash chemistries have similar lime/silica ratios of 0.1 or less.

TABLE I-a

Survey of Available Flake Graphites

| Country: | India | | China | | | Russia | Australia | Madagascar |
|---|---|---|---|---|---|---|---|---|
| Deposit/Supplier | Lashminayaran | Baosham | Dalian Morgan | Asbury 3298 | Cometals | Tegely | | EF |
| Flake Size, mesh | — | — | +885 | — | +894 | — | 894 | — |
| Ash Chemistry (Calcined Basis) | | | | | | | | |
| Silica (SiO$_2$) | 45% | 48% | 53.7% | 57.6% | 57.4% | 55.7% | 39.7% | 48.5% |
| Alumina (Al$_2$O$_3$) | 32.7 | 20.1 | 13.3 | 11.2 | 15.9 | 24.9 | 29.2 | 37.2 |
| Titania (TiO$_2$) | 13 | 0.64 | 0.58 | 0.49 | 1.08 | 0.78 | 1.3 | 0.39 |
| Iron Oxide (Fe$_2$O$_3$) | 13 | 20 | 19.5 | 18.90 | 19.7 | 10.0 | 25.4 | 10.70 |
| Lime (CaO) | 3.6 | 3.4 | 4.6 | 6.41 | 1.92 | 1.3 | 2.2 | 0.28 |
| Magnesia (MgO) | 0.90 | 2.5 | 3.6 | 1.99 | 4.00 | 3.5 | 0.66 | 0.44 |
| Soda (Na$_2$O) | 0.06 | 0.70 | 0.60 | 0.86 | — | 0.55 | 0.65 | — |
| Potash (K$_2$O) | 0.40 | 3.1 | 2.3 | 1.96 | — | 5.2 | 0.35 | — |
| Manganese Oxide (MnO) | — | — | — | — | 0.62 | — | — | — |
| Total | 97.0 | 98.4 | 98.2 | 100.0 | 100.0 | 101.9 | 99.5 | 97.5 |
| Lime/Silica Ratio | 0.08 | 0.07 | 0.09 | 0.11 | 0.03 | 0.02 | 0.06 | 0.01 |
| (As Received Basis) Carbon (C) | 84.6 | 92.2 | — | 90.6 | — | 93.3 | 95.2 | 88.7 |
| Loss on Ignition (2000° F.) | — | — | — | 92.3 | 95.2 | — | — | 90.1 |

TABLE I-b

Survey of Available Flake Graphites (cont'd.)

| Country: | | | | Canada | | | |
|---|---|---|---|---|---|---|---|
| | | | | | | Graphicor | |
| Deposit/Supplier | Mazarin | Stewart Lake | Stratmin | Amalgamet | Diotte | Mousseau | Diotte |
| Flake Size, mesh | +35 | +48 | +50 | 60% + 100 | +48 | +100 | −100 |
| Ash Chemistry (Calcined Basis) | | | | | | | |
| Silica (SiO$_2$) | 47.5% | 47.3% | 44.3% | 49.7% | 27.3% | 38.2% | 29.1% |
| Alumina (Al$_2$O$_3$) | 15.8 | 10.5 | 11.2 | 20.3 | 7.28 | 14.3 | 10.6 |
| Titania (TiO$_2$) | 0.64 | 0.31 | 0.52 | 0.56 | 0.30 | 0.22 | 0.41 |
| Iron Oxide (Fe$_2$O$_3$) | 20.3 | 7.90 | 12.6 | 18.30 | 19.6 | 8.27 | 15.5 |
| Lime (CaO) | 5.22 | 22.4 | 15.8 | 1.88 | 39.2 | 26.10 | 38.1 |
| Magnesia (MgO) | 6.14 | 9.23 | 9.7 | 7.72 | 2.75 | 7.50 | 4.23 |
| Boron Oxide (B$_2$O$_3$) | — | — | — | 0.66 | — | — | — |
| Soda (Na$_2$O) | 0.77 | 0.03 | 2.3 | — | 0.19 | 0.90 | 0.22 |
| Potash (K$_2$O) | 1.37 | 2.13 | 5.8 | — | 0.47 | 1.77 | 1.00 |
| Manganese Oxide (MnO) | 0.18 | — | — | 0.15 | — | 0.21 | — |
| Total Analyzed | 97.9 | 99.8 | 102.2 | 99.3 | 97.1 | 97.5 | 99.2 |

TABLE I-b-continued

| Survey of Available Flake Graphites (cont'd.) | | | | | | | |
|---|---|---|---|---|---|---|---|
| Lime/Silica Ratio | 0.1 | 0.5 | 0.4 | 0.04 | 1.4 | 0.7 | 1.3 |
| (As Received Basis) Carbon (C) | 96.3 | 95.9 | 95.2 | 92.7 | — | 96.1 | — |
| Graphitic Carbon, % | — | — | — | — | 94.2 | — | — |
| Loss on Ignition (2000° F.) | 95.3 | 92.0 | — | 92.5 | 96.5 | — | 93.0 |

It can be seen from the information in Table I-b that some Canadian flake graphites, such as Stewart Lake, Stratmin, and especially Graphicor's Diotte mine, have contrastingly higher lime/silica ratios ranging from 0.4 to 1.4. The flake graphite from these deposits is usually found in basic rock rich in calcium carbonates, magnesium carbonate, and calcium silicates, hence the impurities associated with the flakes usually contain the same mineral assemblages as the host rock.

Most other flake graphite deposits are associated with metamorphosed coal seams which have silica, iron and alumina impurities or are associated with acidic rocks such as granites, or gneisses which predominantly contain acidic compounds like alumina and silica. The graphites shown in Table I-b have carbon contents of 93 to 96%, therefore, the remainder which consists chiefly of ash ranges from 4 to 7 wt. %. Chemical analysis of flake graphite is typically done by several methods as shown in the tables. One method involves a determination of the total carbon of the samples as measured by a Leco carbon analyzer. This method may give an inaccurate determination of the amount of flake graphite, because it measures all forms of carbon such as organic carbon, carbonate carbon and graphite carbon. Loss on ignition is a simpler test which involves determining the weight change of the sample after exposure to 2000° F. The flake graphite sample is exposed to 2000° F. until complete combustion of the graphite occurs. Measurement by a Leco carbon analyzer is generally considered a more meaningful test because of the higher combustion temperatures of the Leco furnace. In the case of Canadian graphites which have high lime/silica ratios, a more meaningful determination of the flake graphite content is a measurement called graphitic carbon. In this test, the sample is first treated either with nitric acid or heat treated in argon to 1470° F. which removes organic carbon and carbonate carbon from the sample, and then the sample is analyzed for carbon by the Leco method.

It can be seen from the data in Table II that an unexpected and surprising effect occurs when flake graphite with a high lime/silica ratio was substituted in magnesite-carbon brick for an equal amount of flake graphite with a lower lime/silica ratio. The brick were made using a procedure well known in the art. The brick were power pressed with several deairing steps at lower pressures followed by a final pressure of 18,000 psi. The data clearly shows a relationship between the lime/silica ratio of the flake graphite and the hot strength of the brick as measured by the crushing strength at 2800° F. The brick with flake graphite having a low lime/silica ratio of 0.08 (mix B) had a hot strength significantly less than brick made with a flake graphite with a higher lime/silica ratio (mix A) even though the graphite used in mix A had a higher purity. The flake graphites used in the mixes were all sized −100 mesh.

Prior art taught that high hot strength metal-free magnesite-carbon mixes could only be attained by using high purity flake graphite. The fact that lower purity flake graphite could be used was an unusual and unexpected benefit. The data shows that very high hot strength could be achieved in mixes containing magnesite and graphite of modest purity (respectively, 96% MgO and 96% carbon).

TABLE II

| | Example | |
|---|---|---|
| | A | B |
| | Graphicor's −195 | Cometals −194 |
| Magnesite-Carbon Mixes and Properties | | |
| Mix: | | |
| Deadburned Magnesite (96% MgO) | | |
| −4 + 10 mesh | 34.9% | 34.9% |
| −10 + 28 mesh | 30.3 | 30.3 |
| −28 mesh | 12.8 | 12.8 |
| Fines, 55% −325 mesh | 5.0 | 5.0 |
| Flake Graphite | | |
| Graphicor −195 (95% C) | 17.0 | — |
| Cometals −194 (93% C) | — | 17.0 |
| Plus Additions: | | |
| Resin | | 3.7% |
| Calculated Screen Analysis | | |
| +4 mesh | | 0% |
| −4 + 10 mesh | | 30 |
| −10 + 28 mesh | | 30 |
| −28 + 65 mesh | | 10 |
| −65 mesh | | 30 |
| −150 mesh | 20 | 21 |
| −325 mesh | | 9 |
| Raw Batch Weight, pounds: | | 26 |
| Mixing Time, minutes: | | 4 |
| Mix Temperature, °F.: | 91 | 100 |
| Measured Density at the Press, pcf: | 185 | 184 |
| Total Linear Expansion from Mold Size After Curing at 350° F., % (Av. 3): | +.69 | +0.69 |

TABLE II-continued

| | Example | |
|---|---|---|
| | A<br>Graphicor's —195 | B<br>Cometals —194 |
| Bulk Density After Curing, pcf (Av. 3): | 181 | 184 |
| Data From Porosity (After Coking at 2000° F.) | | |
| Unimpregnated (Av. 3) | | |
| Bulk Density, pcf: | 177 | 178 |
| Apparent Porosity, %: | 10.8 | 10.8 |
| Apparent Specific Gravity: | 3.18 | 3.19 |
| Modulus of Rupture, psi, At 2000° F. (Av. 3): | 1580 | 1050 |
| Crushing Strength, psi, at 2800° F. (Av. 6): | 3310 | 2280 |
| sulfur trioxide ($SO_2$), %: | 0.21 | 0.02 |
| Graphite Analyses | | |
| Screen Analysis | | |
| % Held on 65 mesh | T   T | T   T |
| 100 | 7 | 8 |
| 150 | 30   37 | 23   31 |
| 200 | 23 | 23 |
| 270 | 16 | 21 |
| 325 | 6 | 8 |
| Pass 325 mesh | 18   63 | 17   69 |
| Ash Chemistry | | |
| (Calcined Basis) | | |
| Silica ($SiO_2$) | 32.69% | 46.38% |
| Alumina ($Al_2O_3$) | 13.79 | 24.24 |
| Titania ($TiO_2$) | 0.41 | 0.76 |
| Iron Oxide ($Fe_2O_3$) | 17.07 | 18.82 |
| Chromic Oxide ($Cr_2O_3$) | 0.13 | 0.10 |
| Lime (CaO) | 28.88 | 3.68 |
| Magnesia (MgO) | 4.97 | 3.77 |
| Zirconia ($ZrO_2$) | <0.10 | <0.10 |
| Phosphourous Pentoxide $P_2O_5$) | 0.53 | 0.16 |
| Boron Oxide ($B_2O_3$) | 0.02 | 0.03 |
| Soda ($Na_2O$) | 0.29 | 0.37 |
| Potash ($K_2O$) | 1.01 | 1.12 |
| Lithia ($Li_2O$) | 0.02 | 0.01 |
| Manganese Oxide (MnO) | 0.15 | 0.16 |
| Total | 99.96% | 99.60% |
| Lime/Silica Ratio | 0.9 | 0.08 |
| As Received Basis | | |
| Carbon (C), %: | 95.9 | 94.1 |
| Loss on Ignition (LOI), %: | 96.0 | 95.2 |
| Graphitic Carbon (Cg), %*: | 95.33 | 93.37 |
| Sulfur Trioxide ($SO_2$), %: | 0.21 | 0.02 |

*Graphitic carbon was determined by leaching the graphite with nitric acid solution to remove the $CO_2$ that is associated with carbonates.

The reason(s) why the addition of flake graphite with a lime/silica ratio in its ash greater than 0.2 provides an increase in hot strength in magnesite-carbon brick is not fully understood. It is suspected that these flake graphites at elevated temperatures are more resistant to insitu oxidation. That is, flake graphite is prone to oxidation, because carbon reacts with the accessory silicates and undergoes the reaction $C + SiO_2 \ SiO_{(g)} \ CO_{(g)}$. In flake graphites with high lime/silica ratios the silica is tied up with lime forming a stable calcium silicate which is not readily reduced by carbon. Hence, the refractory containing such graphites are stronger at high temperatures.

Another study was conducted to determine if there was a linear relationship between using flake graphites of contrasting ash chemistries and the hot crushing strength of brick made with these flake graphites. As Table 3 shows, brick made with flake graphite having similar particle size and carbon contents but contrasting lime/silica ratios did not appear to have uniformly increasing hot strength as the lime/silica ratio increased. Unfortunately, it is very difficult to find commercially available flake graphites which have lime/silica ratios between 0.1 and 0.8. Therefore, it is difficult to know with certainty if a linear relationship exists, but the hot strength data from brick made with flake graphite having a lime/silica ratio of 2.1 suggests that the relationship is not linear.

This additional study supported the prior study which showed low hot strength occurred when flake graphites were used that had a low lime/silica ratio of less than 0.8. However, when flake graphites were used that had a lime/silica ratio of 0.8 or greater, then significantly higher hot strengths were obtained.

Table 4 lists the chemistry of the flake graphites used in making the bricks set forth in Table 3.

FIG. 1 depicts the relationship between the lime/silica ratio in the flake graphite versus the hot crushing strength of the brick made with the flake graphites set forth in Table 4.

TABLE 3

Brick Made With Flake Graphites Having Contrasting Lime/Silica Ratios

| | Mix: | | | | |
|---|---|---|---|---|---|
| | A | B | C | D | E |
| Deadburned Magnesite (96% MgO) | | | | | |
| −4 + 10 mesh | 32.2% | 32.2% | 32.2% | 32.2% | 32.2% |
| −10 + 28 mesh | 31.0 | 31.0 | 31.0 | 31.0 | 31.0 |
| −28 mesh | 15.8 | 15.8 | 15.8 | 15.8 | 15.8 |
| BM 55 | 4.0 | 4.0 | 4.0 | — | — |
| Cometals −194 Graphite (C/S = 0.08) | 17.0 | — | — | — | — |
| Graphicor −192 Graphite (C/S = 0.8) | — | 17.0 | — | — | — |
| Graphicor −195 (C/S = 0.9) | — | — | 17.0 | — | — |
| Asbury −196 Graphite (C/S = 0.9) | — | — | — | 17.0 | — |
| Graphicor −194 Graphite (C/S = 2.1) | — | — | — | — | 17.0 |
| Plus Addition: | | | 3.7% | | |
| Resin | | | | | |
| Density at Press, pcf (Av. 1): | 184 | 185 | 185 | 185 | 185 |
| Density After Baking, pcf (Av. 3): | 181 | 182 | 182 | 182 | 182 |
| Coked Properties (Av. 3) | | | | | |
| Bulk Density, pcf: | 177 | 177 | 177 | 177 | 177 |
| Porosity, %: | 10.0 | 9.9 | 9.4 | 9.2 | 9.4 |
| A.S.G.: | 3.14 | 3.14 | 3.13 | 3.12 | 3.13 |
| Modulus of Rupture, psi (Av. 3) At 2000° F.: | 1130 | 1330 | 1320 | 1250 | 1190 |
| Crushing Strength, psi (Av. 6) At 2800° F.: | 2330 | 2950 | 3040 | 3000 | 2990 |

TABLE 4

Chemistry of Flake Graphites Used in Table 3

| | Mix: | | | | |
|---|---|---|---|---|---|
| | A | B | C | D | E |
| Graphite Type: | Cometals −194 | Graphicor −192 | Graphicor −195 | Asbury** M100 CA 96 | Graphicor −194 |
| Chemical Analysis* | | | | | |
| (Calcined Basis) | | | | | |
| Silica (SiO$_2$) | 46.38% | 32.95% | 32.69% | 28.0% | 18.7% |
| Alumina (Al$_2$O$_3$) | 24.24 | 13.75 | 13.79 | 5.8 | 6.2 |
| Titania (TiO$_2$) | 0.76 | 0.39 | 0.41 | 0.4 | 0.1 |
| Iron Oxide (Fe$_2$O$_3$) | 18.82 | 21.34 | 17.07 | 33.2 | 33.7 |
| Lime (CaO) | 3.68 | 25.73 | 28.88 | 25.2 | 39.9 |
| Magnesia (MgO) | 3.77 | 3.83 | 4.97 | 4.0 | — |
| Phosphorous Pentoxide (P$_2$O$_5$) | — | 0.44 | 0.53 | — | — |
| Soda (Na$_2$O) | 0.37 | 0.27 | 0.29 | — | — |
| Potash (K$_2$O) | 1.12 | 0.82 | 1.01 | 2.9 | 1.2 |
| Lithia (Li$_2$O) | 0.01 | 0.02 | 0.02 | — | — |
| Manganese Oxide (MnO) | 0.16 | 0.16 | 0.15 | 0.5 | 0.2 |
| Total | 99.31% | 99.70% | 99.81% | 100.0% | 100.0% |
| Lime/Silica Ratio | 0.08 | 0.8 | 0.9 | 0.9 | 2.1 |
| (As Received Basis) | 94.1 | 94.2 | 95.9 | 96.4 | 94.7 |
| Carbon (C) | | | | | |
| Sulfur Trioxide (SO$_3$) | 0.02 | 0.23 | 0.21 | 0.24 | 0.23 |
| Graphitic Carbon (Cg) | 93.37 | 92.42 | 95.33 | 96.5 | 94.1 |
| Loss on Ignition (2000° F.) | 95.2 | 94.6 | 96.0 | 97.1 | 95.5 |
| Screen Analysis: | | | | | |
| % Held on 48 mesh | Tr | — | — | Tr | TR |
| 65 mesh | Tr   Tr | Tr   Tr | Tr   Tr | <1   <1 | 1   1 |
| 100 mesh | 8 | 6 | 7 | 4 | 9 |
| 150 mesh | 23   31 | 27   33 | 30   37 | 18   22 | 23   32 |
| 200 mesh | 23 | 20 | 23 | 21 | 21 |
| 270 mesh | 21 | 15 | 16 | 22 | 19 |
| 325 mesh | 8   52 | 7   42 | 6   45 | 13   56 | 10   50 |
| Pass 325 mesh | 17   17 | 25   25 | 18   18 | 21   21 | 17   17 |

*Carbon, Graphitic Carbon and SO$_3$ by Leco; all others by Uniquant (Normalized Analysis)
**From Stratmin Mine, Quebec, Canada While the above examples contained flake graphite, other forms of natural graphite such as vein graphite which also may possess a relatively high lime/silica ratio of more than 0.2 may provide an increase in hot strength.

As to the magnesite, it is necessary that it contain at least about 95% MgO.

Also included in the mix must be a carbonaceous bonding agent that yields high levels of carbon on pyrolysis; i.e., over about 25% by weight carbon. Examples are any novolak or resol resin, tar pitch or mixtures thereof, and the like conventionally used for bonding brick. At the temperatures at which these brick are used, these materials are decomposed and the carbon derived acts to bind the brick. The amounts thereof are not critical, and any amount sufficient to bond the mix can be utilized, but it is desired to avoid high binder levels in order to avoid difficulties in brick formation during processing. Ordinarily about 1 to 6% by weight of such bonding agent is added for each 100% by weight of the mix.

Also, the addition of minor amounts of metal additives of aluminum and/or magnesium or a mixture thereof acts to increase the hot strength of the refractory. Ordinarily about 0.1 to 10 wt. % −28 mesh metal additive is included in the mix to give the desired hot strength without the undesirable effects associated with such metals.

Also, in another respect, about 0.1 1 to 10 wt. % of boron carbide, nitride, silicon nitride powder or mixtures thereof are added to the mix for increased hot strength, increased oxidation resistance and corrosion resistance.

Also, 0.1 to 10 wt. % silicon powder is added to the mix to prevent aluminum or magnesium carbides from reacting with water.

The method of forming the brick is not critical in that the components noted above can be simply admixed, pressed into shape in the usual brick-making presses, and then baked at the conventional temperatures, i.e., about 250° to 550° F. to form the unburned brick which are then used as noted above, particularly as linings for basic oxygen furnaces. In use, the brick become heat treated at high temperatures in such furnaces to form carbon-bonded brick of high hot strength and improved slag resistance.

The brick of the present invention are particularly suitable as linings for basic oxygen furnaces where their increased hot strength, slag resistance, and stability at high temperatures results in longer times between furnace relines.

The brick of the present invention are made to the size and shape required to form the entire lining or a portion of lining of any metallurgical vessel. The linings are formed in the conventional manner by forming courses, or rings, of the proper size brick about the interior of the vessel. Other construction techniques are also commonly used and, of course, in areas where brick cannot be used, refractory ramming mixes are utilized.

The present inventive mix provides a means of using relatively impure flake graphites with 2 to 10 wt. % ash while maintaining high crushing strength at 2800° F. of at least 2300 psi and often with strengths above 3000 psi. In order to achieve these strengths, prior art taught that flake graphites with less than 2% ash were required to achieve these strengths.

Refractory liners made from said shapes provide a method of increasing the life of various metallurgical vessels. These shapes have improved high temperature stability because their flake graphite contains a more stable phase assemblage at elevated temperatures than graphites of prior usage. This improved stability is reflected in higher 2800° F. crushing strengths.

While the invention has been described in connection with a preferred embodiment, it is not intended to limit the scope of the invention to the particular form set forth, but on the contrary, it is intended to cover such alternatives, modifications and equivalents as may be included within the spirit and scope of the invention as defined by the appended claims.

What is claimed is:

1. A mix for forming a magnesite-carbon refractory shape comprising from about 70 to 97 wt. % deadburned magnesite and, correspondingly, about 3 to 30 wt. % flake graphite and for each 100 wt. % of said magnesite and graphite from about to 6 wt. % of a carbonaceous bonding agent, said magnesite containing at least about 95% MgO, and said graphite having a lime/silica ratio in its ash greater than 0.2 and said graphite having a carbon content ranging from 90 to 99 wt. % as measured by the loss on ignition test.

2. The mix of claim 1 wherein said carbonaceous bonding agent is a novolak resin, a resol resin, tar, pitch or mixtures thereof.

3. The mix of claim 1 which also contains 0.1 to 19 wt. % of metal additives selected from the group consisting of aluminum, magnesium and mixtures thereof.

4. The mix of claim 3 which also contains 0.1 to 10 wt. % of silicon powder.

5. The mix of claim 1 which also contains 0.1 to 10 wt. % of material selected from the group consisting of boron carbide, boron nitride, silicon nitride powder and mixtures thereof.

6. An unburned magnesite-carbon refractory shape consisting of a cured mix comprising from about 70 to 97 wt. % deadburned magnesite and, correspondingly, about 3 to 30 wt. % flake graphite, and for such 100 wt. % of said magnesite and graphite from about 1 to 6 wt. % of a carbonaceous bonding agent; said magnesite containing at least about 95% MgO, and said graphite having a lime/silica ratio in its ash greater than 0.2 and said graphite having a carbon content ranging from 90 to 99 wt. % as measured by the loss on ignition test.

7. The refractory shape of claim 6 wherein said shape is a brick.

8. The refractory shape of claim 6 wherein said carbonaceous bonding agent is a novolak resin, a resol resin, tar, pitch or mixtures thereof.

9. The refractory shape of claim 6 which also contains 0.1 to 10 wt. % of metal additives selected from the group consisting of aluminum, magnesium and mixtures thereof.

10. The refractory shape of claim 9 which also contains 0.1 to 10 wt. % silicon powder.

11. The refractory shape of claim 6 which also contains 0.1 to 10 wt. % of material selected from the group consisting of boron carbide, boron nitride, silicon nitride powder or mixtures thereof.

12. A refractory brick lining for metallurgical furnaces wherein the principal mode of wear of the lining is by cracking caused by high stresses or by turbulence of molten metal and slag, said lining comprising a plurality of unburned magnesite-carbon brick, said brick consisting essentially of from about 70 to 97 wt. % of deadburned magnesite and, correspondingly, about 3 to 30 wt. % flake graphite, and for each 100 wt. % of said magnesite and graphite from about to 6 wt. % of a carbonaceous bonding agent; said magnesite containing at least about 95% MgO and said graphite having a lime/silica ratio in its ash greater than 0.2 and said graphite having a carbon content ranging from 90 to 99 wt. % as measured by the loss-on-ignition test.

13. The refractory brick liner of claim 12 wherein said carbonaceous bonding agent is a novolak resin, a resol resin, tar, pitch or mixtures thereof.

14. The refractory brick liner of claim 12 which also contains 0.1 to 10 wt. % of metal additives selected from the group consisting of aluminum, magnesium and mixtures thereof.

15. The refractory brick liner of claim 14 which also contains 0.1 to 10 wt. % silicon powder.

16. The refractory brick liner of claim 12 which also contains 0.1 to 10 wt. % of material selected from the group consisting of boron carbide, boron nitride, silicon nitride powder or mixtures thereof.

17. The method of increasing the life of liners for metallurgical furnaces wherein the principal mode of wear of the lining is by cracking caused by high stresses or by turbulence of molten metal and slag, the method consisting of forming a lining for said furnaces comprising a plurality of unburned magnesite-carbon brick and subsequently heat treating said brick; said unburned brick consisting essentially of a cured mix comprising from about 70 to 97 wt. % deadburned magnesite and, correspondingly, about 3 to 30 wt. % flake graphite, and for each 100 wt. % of said magnesite and graphite from about 1 to 6 wt. % of a carbonaceous bonding agent; said magnesite containing at least about 95% MgO and said graphite having a lime/silica ratio in its ash greater than 0.2 and said graphite having a carbon content ranging from 90 to 99 wt. % as measured by the loss on ignition test.

18. The method of claim 17 wherein said carbonaceous bonding agent is a novolak resin, a resol resin, tar, pitch, or mixtures thereof.

19. The method of claim 17 wherein said liner also contains 0.1 to 10 wt. % of metal additives selected from the group consisting of aluminum, magnesium and mixtures thereof.

20. The method of claim 19 wherein said liner also contains 0.1 to 10 wt. % silicon powder.

21. The method of claim 17 wherein said liner also contains 0.1 to 10 wt. % of material selected from the group consisting of boron carbide, nitride, silicon nitride powder and mixtures thereof.

* * * * *